(12) United States Patent
Park et al.

(10) Patent No.: US 9,036,522 B2
(45) Date of Patent: May 19, 2015

(54) LOW POWER WIRELESS COMMUNICATION APPARATUSES AND METHOD THEREOF

(75) Inventors: Chang Soon Park, Chungju-si (KR); Young Soo Kim, Seoul (KR); Tae In Hyon, Hwaseong-si (KR); Minchae Jung, Seoul (KR); Kyuho Hwang, Seoul (KR); Sooyong Choi, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 313 days.

(21) Appl. No.: 13/359,815

(22) Filed: Jan. 27, 2012

(65) Prior Publication Data

US 2013/0155927 A1    Jun. 20, 2013

(30) Foreign Application Priority Data

Dec. 19, 2011    (KR) .................. 10-2011-0137101

(51) Int. Cl.
  *H04W 16/10*    (2009.01)
  *H04W 16/16*    (2009.01)
  *H04W 52/02*    (2009.01)
  *H04W 74/00*    (2009.01)

(52) U.S. Cl.
  CPC .......... *H04W 16/10* (2013.01); *H04W 52/0216* (2013.01); *H04W 16/16* (2013.01); *H04W 74/002* (2013.01)

(58) Field of Classification Search
  CPC ............ H04W 12/08; H04W 52/0212; H04W 52/0251; H04W 72/02; H04W 16/10; H04W 16/16; H04W 52/0216; H04W 74/002; G08C 17/02
  See application file for complete search history.

(56) References Cited

U.S. PATENT DOCUMENTS

| | | | |
|---|---|---|---|
| 2007/0094691 A1* | 4/2007 | Gazdzinski | 725/62 |
| 2007/0281617 A1 | 12/2007 | Meylan et al. | |
| 2011/0034194 A1* | 2/2011 | Han et al. | 455/509 |
| 2011/0219229 A1* | 9/2011 | Cholas et al. | 713/168 |
| 2012/0063395 A1* | 3/2012 | Ho | 370/329 |

FOREIGN PATENT DOCUMENTS

| | | |
|---|---|---|
| KR | 10-2008-0050983 A | 6/2008 |
| KR | 10-2009-0078298 A | 7/2009 |
| KR | 10-2010-0063255 A | 6/2010 |
| KR | 10-2010-0066284 A | 6/2010 |
| KR | 10-2011-0017657 A | 2/2011 |

* cited by examiner

*Primary Examiner* — Jianye Wu
(74) *Attorney, Agent, or Firm* — NSIP Law

(57) ABSTRACT

Provided are low-power wireless communication apparatuses and a method thereof. A hub may receive a beacon signal from a neighboring hub that is within a predetermined area from the hub, and control an operation of a node served by the hub based on information received from the neighboring hub.

22 Claims, 8 Drawing Sheets

NODE A : LOW PRIORITY
NODE B : HIGH PRIORITY

LOW POWER WIRELESS COMMUNICATION APPARATUSES AND METHOD THEREOF

CROSS-REFERENCE TO RELATED APPLICATION(S)

This application claims the benefit under 35 U.S.C. §119(a) of Korean Patent Application No. 10-2011-0137101, filed on Dec. 19, 2011, in the Korean Intellectual Property Office, the entire disclosure of which is incorporated herein by reference for all purposes.

BACKGROUND

1. Field

The following description relates to a low-power wireless communication apparatuses and a method thereof.

2. Description of Related Art

Because wireless communication networks may overlap in the same location, performance degradation may occur, and energy consumption may increase because of interference that occurs between the wireless communication networks.

For example, a wireless body area network (WBAN) may have a hub and a plurality of nodes. A node may have a relatively low capacity for storing energy. Accordingly, there may be a limit to an amount of power to be used for the node. In response to an increase in energy consumption due to interference from another WBAN that mutually exists with the WBAN, a possibility of a defect occurring in a system operation may increase, and efficiency of the system operation may greatly decrease.

Accordingly, there is a desire for a technology that decreases energy consumption in an environment in which multiple WBANs mutually exist.

SUMMARY

In one general aspect, there is provided a low-power wireless communication apparatus, including a receiver configured to receive a beacon signal from a neighboring hub that is within a predetermined area, and a controller configured to determine whether the neighboring hub operates in an exclusive access phase (EAP) period in which a node served by the neighboring hub has exclusive access to a wireless channel, based on the beacon signal, and to control an operation of a node served by the low-power communication apparatus based on information about a point at which the EAP period terminates.

The controller may be further configured to maintain an operation of the node served by the low-power communication apparatus in a sleep mode until the neighboring hub terminates an operation of the EAP period.

The low-power wireless communication apparatus may further comprise a transmitter configured to transmit an instruction for controlling an operation of the node served by the low-power communication apparatus.

The low-power wireless communication apparatus may further comprise a sensing unit configured to sense an access of a wireless communication network by the neighboring hub, a security determining unit configured to determine whether a communication scheme of the sensed access of the wireless communication network is protected by security, and a security association unit configured to perform a security association operation with the sensed neighboring hub using an encryption key, in response to the communication scheme of the sensed access of the wireless communication network being protected by security.

The sensing unit may comprise an identification (ID) information receiver configured to receive ID information from a node of the wireless communication network being accessed, an ID information determining unit configured to determine whether the received ID information matches ID information stored in a database (DB) of the low-power wireless communication apparatus, a counter configured to increase a count value, in response to the received ID information not matching the ID information stored in the DB, and a neighbor determining unit configured to determine whether the sensed wireless communication network is within a predetermined distance, in response to the count value of the counter calculated from the predetermined node being greater than or equal to a predetermined threshold.

The controller may be configured to obtain information about a starting point of a random access phase (RAP) period of the neighboring hub by decoding the beacon signal, and to maintain an operation of the node served by the low-power communication apparatus in a sleep mode until the starting point of the RAP is reached.

The transmitter may be configured to transmit a beacon signal including an indicator indicating that the node operates in the EAP period.

The low-power wireless communication apparatus may be a hub in a wireless body area network (WBAN), and the neighboring hub may be a hub in a neighboring WBAN, and the node served by the neighboring hub may have a higher priority than the node served by the low-power wireless communication apparatus.

In another aspect, there is provided a low-power wireless communication apparatus, including a receiver configured to receive an instruction, from a hub of a wireless communication network, for controlling an operation of a node, and a controller configured to control an operation of the node based on the instruction.

The receiver may be configured to receive, from the hub, an instruction for maintaining an operation of the node in a sleep mode until a neighboring hub terminates an operation of an exclusive access period (EAP) period in which a node served by the neighboring hub has exclusive access to a wireless channel.

The low-power wireless communication apparatus may further comprise a transmitter configured to transmit sensed biometric information to the hub after the EAP period of the neighboring hub terminates.

The receiver may be configured to receive information about a starting point of a random access phase (RAP) period of a neighboring hub, and the controller may be configured to maintain an operation of the node in a sleep mode until the starting point is reached.

The low-power wireless communication apparatus may be a node in a wireless body area network (WBAN), and the neighboring hub may be a neighboring WBAN serving a node that has a priority that is higher than the low-power wireless communication apparatus.

In another aspect, there is provided a method for low-power wireless communication, the method including receiving, by a hub, a beacon signal from a neighboring hub entering a to predetermined area, determining whether the neighboring hub operates in an exclusive access phase (EAP) period in which a node served by the neighboring hub has exclusive access to a wireless channel, based on the beacon signal, and controlling an operation of a node served by the hub based on information about a point at which the EAP period terminates.

The controlling may comprise maintaining an operation of the node served by the hub in a sleep mode until the neighboring hub terminates an operation of the EAP period.

The method may further comprise transmitting, to the node served by the hub, an instruction for controlling an operation of the node.

The method may further comprise sensing an access of a wireless communication network by the neighboring hub, determining whether a communication scheme of the sensed access of the wireless communication network is protected by security, and performing a security association operation with the neighboring hub using an encryption key, in response to the communication scheme of the sensed wireless communication network being protected by security.

The sensing may comprise receiving identification (ID) information from a node of the wireless communication network being accessed, determining whether the received ID information matches ID information stored in a database (DB) of the hub, increasing a count value, in response to the ID information not matching ID information stored in the DB, and determining whether the sensed wireless communication network is within a predetermined distance, in response to the count value of the counter calculated from the predetermined node being greater than or equal to a predetermined threshold.

The hub may be a hub in a wireless body area network (WBAN), and the neighboring hub may be a hub in a neighboring WBAN, and the node served by the neighboring hub may have a higher priority than the node served by the low-power wireless communication apparatus.

Other features and aspects will be apparent from the following detailed description, the drawings, and the claims.

Figure 1:
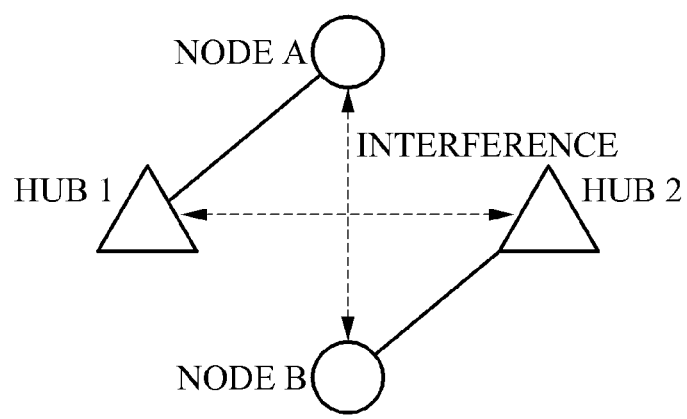
FIG. 1 is a diagram illustrating an environment in which two wireless communication networks mutually exist according to a conventional art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an environment in which two wireless communication networks mutually exist according to a conventional art.

Referring to FIG. 1, a wireless communication network including a hub 1 and a node A mutually exist with another wireless communication network including a hub 2 and a node B. In this example, the wireless communication network may correspond to a wireless body area network (WBAN). Hereinafter, a wireless communication network may be considered to be a WBAN.

For example, the WBAN may include a single hub and a plurality of nodes. Referring to FIG. 1, the WBAN includes a single hub and a single node. In an example in which two WBANs coexist, a hub and/or a node included in one WBAN may interfere with a hub and/or a node included another WBAN. The interference may degrade system performance and cause an increase of energy consumption in each node.

A node included in each WBAN may communicate with a hub using a priority. For example, node A may have a lower priority than the node B. An example of an operation of node A and node B is described with reference to FIG. 2. For example, node B may be a heart monitoring node that senses biometric signals from a person's heart, thus having a higher priority than other sensors.

Figure 2:
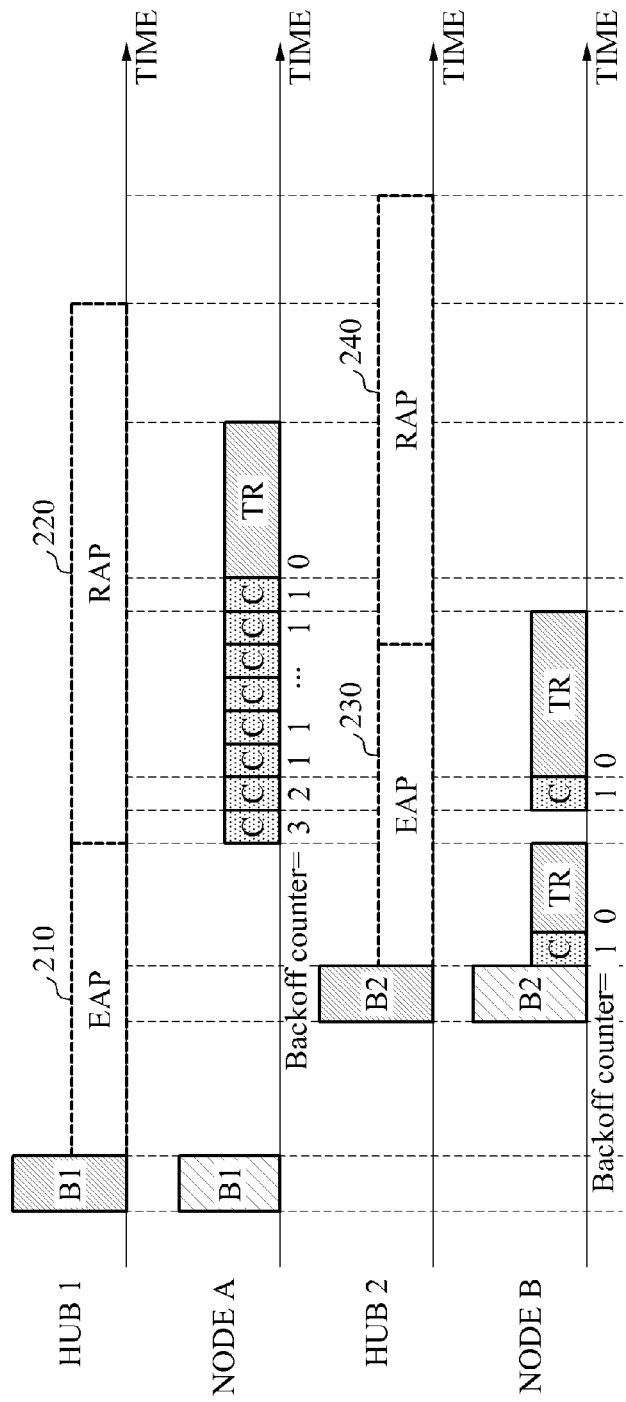
FIG. 2 is a diagram illustrating an operation of a hub and a node included in each of the wireless communication networks of FIG. 1.

FIG. 2 illustrates an operation of a hub and a node included in each wireless communication network of FIG. 1.

Referring to FIG. 2, a superframe used by a node in a wireless communication network may support a beacon mode that is operating in conjunction with a beacon signal of a hub.

For example, node A having a lower priority than a node B may transmit a signal after contention in a random access phase (RAP) period 220, and may not transmit a signal in an exclusive access phase (EAP) period 210. Node B having a higher priority may transmit a signal in an EAP period 230 and in a RAP period 240.

Node A may continuously detect a signal of node B in a channel, and may transmit a signal to a hub 1 only when the channel is detected as empty. In this example, because the node A continuously detects a channel state until the signal of the node B fails to be detected in the channel, energy consumption in the wireless communication network is significant.

Figure 3:
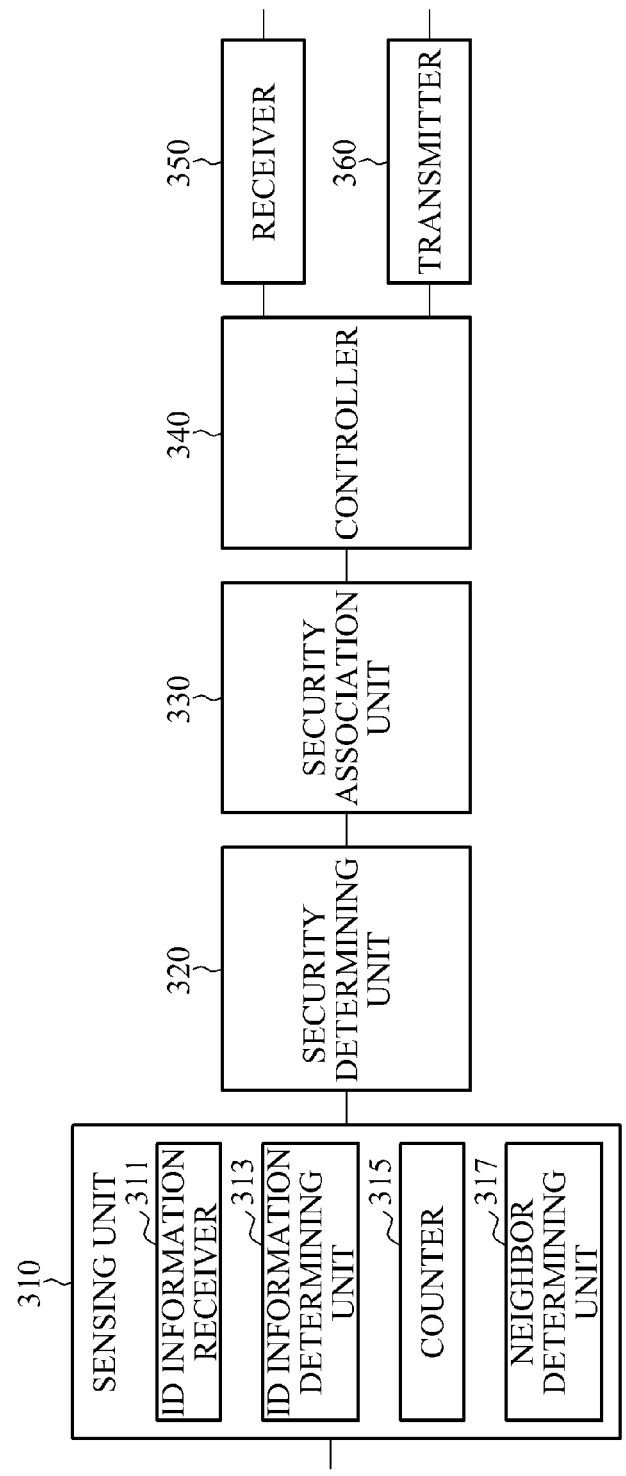
FIG. 3 is a diagram illustrating an example of a low-power wireless communication apparatus.

FIG. 3 illustrates an example of a low-power wireless communication apparatus according to various aspects.

Referring to FIG. 3, a low-power wireless communication apparatus includes a sensing unit 310, a security determining unit 320, a security association unit 330, a controller 340, a receiver 350, and a transmitter 360. The low-power wireless communication apparatus of FIG. 3 may be a hub in a wireless communication network. For example, the wireless communication network may refer to a WBAN.

The receiver 350 may receive a beacon signal from a neighboring hub in a predetermined area. The receiver 350 may receive the beacon signal from the neighboring hub associated with the neighboring hub in an area in which communication may be performed. For example, the neighboring hub may be a hub included in another WBAN.

The controller 340 may determine whether the neighboring hub operates in an exclusive access phase (EAP) period based on the received beacon signal. The controller 340 may control an operation of a node included in the same wireless communication network as the low-power wireless communication apparatus based on information, about a point at which the EAP period terminates, which may be included in the beacon signal. The controller 340 may determine whether the neighboring hub operates in the EAP period based on a value of an EAP indicator included in the beacon signal. For example, the controller 340 may determine that the neighboring hub operates in the EAP period when the EAP indicator is set to "1".

In this example, the controller 340 may maintain an operation of the node in a sleep mode until the neighboring hub terminates an operation in the EAP period. The controller 340 may generate a sleep mode conversion instruction signal.

The transmitter 360 may transmit an instruction to the node to control an operation of the node.

The sensing unit 310 may sense an access of a wireless communication network. The access of a wireless communication network may refer to an access of a hub or a node that is included in the wireless communication network. For example, the sensing unit 310 may sense an access of a neighboring hub or a neighboring node based on a beacon signal that is received from the neighboring hub or the neighboring node. The neighboring node may refer to a node included in another WBAN.

The security determining unit 320 may determine whether a communication scheme of the wireless communication network sensed by the sensing unit 310 is protected by security.

For example, the security association unit 330 may perform a security association operation with the sensed wireless communication network using an encryption key when the communication scheme of the wireless communication network sensed by the sensing unit 310 is protected by security. In this example, a general encryption key used for communication security may be used as the encryption key.

The sensing unit 310 may include an identification (ID) information receiver 311, an ID information determining unit 313, a counter 315, and a neighbor determining unit 317.

The ID information receiver 311 may receive ID information from a node of the wireless communication network being accessed. In this example, the ID information may refer to an ID of the node.

The ID information determining unit 313 may determine whether ID information stored in a database (DB) matches the ID information received by the ID information receiver 311. For example, the ID information determining unit 313 may determine whether a received ID is included in IDs stored in the hub. The IDs stored in the hub may include IDs of nodes forming a wireless communication network with the hub.

The counter 315 may increase a count value, in response to the ID information received by the ID information receiver 311 not being included in the ID information stored in the DB. In this example, the ID information may be stored in advance in the DB.

The neighbor determining unit 317 may determine whether a wireless communication network including a predetermined node is a neighboring wireless communication network that is within a predetermined distance, in response to the count value of the counter 315 calculated from the predetermined node being greater than or equal to a predetermined threshold. For example, the predetermined threshold may be set by a user, may be set based on intervals of receiving ID information from the node, and the like. In this example, if the predetermined node transmits ID information not stored in a DB a number of times greater than or equal to a predetermined value, the predetermined node may be determined as being located in a static state in a predetermined area from the hub.

The controller 340 may obtain information about a starting point of a random access phase (RAP) period of the neighboring hub by decoding the beacon signal. The controller 340 may maintain an operation of a node corresponding to a relatively low priority in a sleep mode until the starting point is reached. For example, the controller 340 may generate a control instruction signal for causing a node to convert into a sleep mode. The RAP may be a period in which nodes may randomly access a channel to perform communication with a hub.

The neighboring hub may transmit a beacon signal including an indicator indicating that the neighboring hub operates in the EAP period.

The controller 340 may generally control the low-power wireless communication apparatus, and may perform a function of the sensing unit 310, the security determining unit 320, the security association unit 330, the receiver 350, and/or the transmitter 360. FIG. 3 separately illustrates components to separately describe each function. However, it should be appreciated that the controller 340 may perform one or more of the components or a portion of the components.

Figure 4:
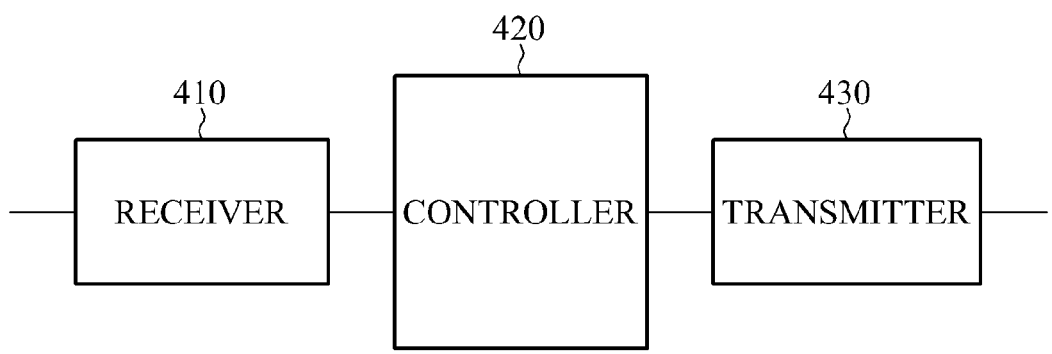
FIG. 4 is a diagram illustrating another example of a low-power wireless communication apparatus.

FIG. 4 illustrates another example of a low-power wireless communication apparatus.

Referring to FIG. 4, a low-power wireless communication apparatus includes a receiver 410, a controller 420, and a transmitter 430. The low-power wireless communication apparatus of FIG. 4 may be a node in a wireless communication network. For example, the wireless communication network may refer to a WBAN.

The receiver 410 may receive an instruction from a hub of the wireless communication network. The instruction may be for controlling an operation of the node. For example, the receiver 410 may receive an instruction for converting an operation of the node into a sleep mode, and maintaining the sleep mode until the neighboring hub terminates an operation in the EAP period. In some examples, the node may not be allowed to communicate with the hub during the EAP period, and thus, may operate in the sleep mode during the EAP period in order to reduce an amount of energy expended by the node.

The controller 420 may control an operation of the node based on the instruction received by the receiver 410. For example, the controller 420 may convert an operation mode of the node into the sleep mode. The node may not perform wasteful channel detection in the EAP period by operating in the sleep mode. Thus, an amount of energy expended by the node may be reduced.

The receiver 410 may receive information about a starting point of an RAP period of a neighboring hub, and the controller 420 may maintain an operation of a node corresponding to a relatively low priority in a sleep mode until the starting point is reached at which time the controller 420 may control the node to wake up.

The transmitter 430 may transmit information to the hub after the EAP period of the neighboring hub terminates. For example, the transmitter 430 may transmit biometric information to be sensed by the node in addition to the biometric information.

In response to the EAP period being terminated and the RAP being started, the controller 420 may determine an order with which to transmit information to the hub to prevent a collision through contention from occurring with other nodes.

The controller 420 may generally control the low-power wireless communication apparatus, and may perform a function of the receiver 410 and the transmitter 430. FIG. 4 separately illustrates components to separately describe each function. However, it should be appreciated that the controller 420 may perform one or more of the components or a portion of the components.

Figure 5:
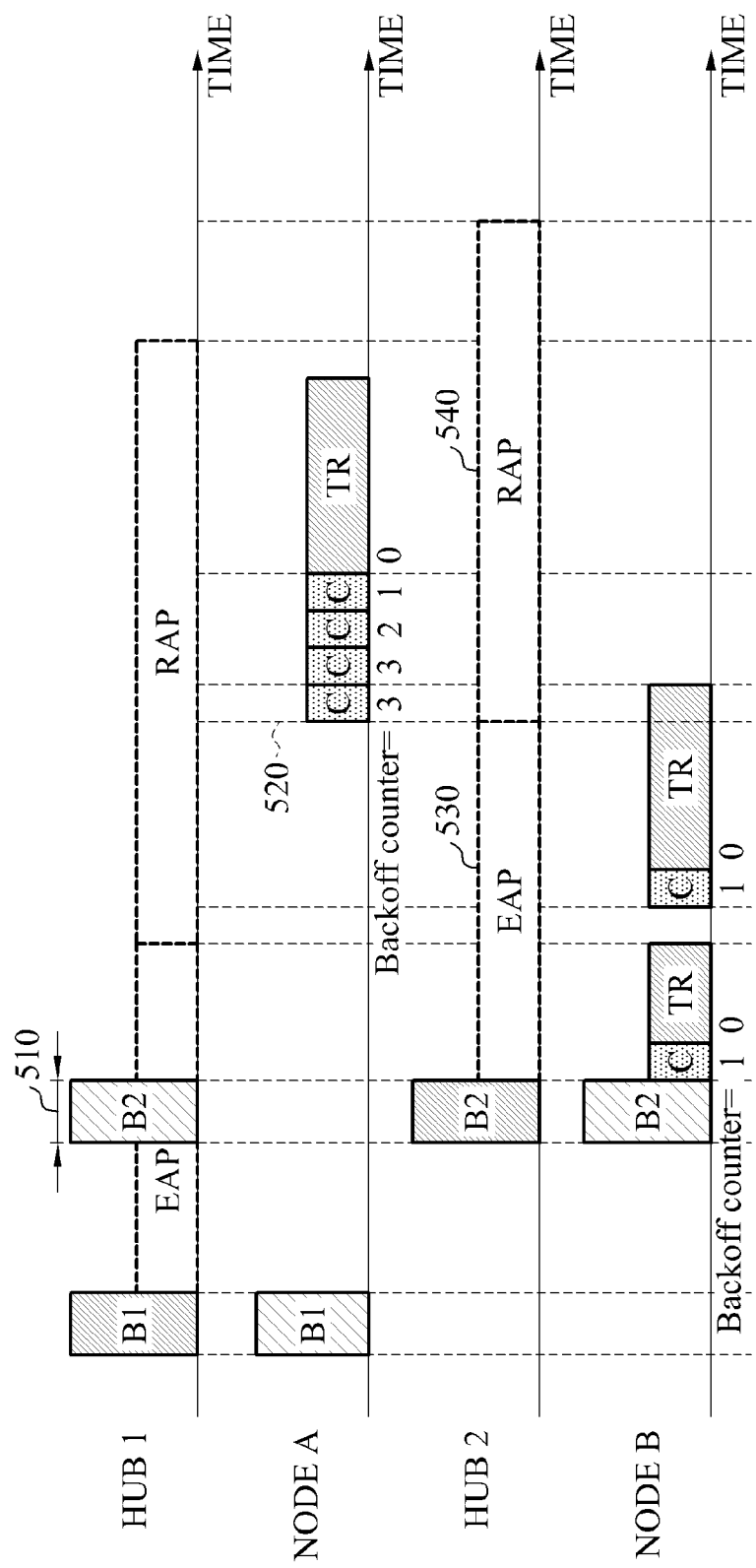
FIG. 5 is a diagram illustrating an example of an operation of a hub and a node in a low-power wireless communication environment.

FIG. 5 illustrates an example of an operation of a hub and a node in a low-power wireless communication system.

Referring to FIG. 5, a hub 1 and a node A are included in a first WBAN, and a hub 2 and a node B are included in a second WBAN corresponding to a neighboring WBAN. In this example, node B has a higher priority than node A. Accordingly, node B may have a priority in communicating with the hub 2 in an EAP period 530.

The hub 1 may receive a beacon signal 510 of the hub 2 corresponding, and may obtain information about a point 520 at which the EAP period 530 of the neighboring WBAN is to terminate. Based on the information about the point 520, the hub 1 may transmit an instruction to the node A. For example, the instruction may be an instruction for maintaining a sleep mode until the point 520 at which the EAP period 530 of the neighboring WBAN terminates or a starting point of an RAP 540 is reached. The node A may reduce energy consumption by operating in the sleep mode according to the instruction. In this example, the node A may reduce energy consumption by operating in the sleep mode without detecting a channel state until a signal of the node B fails to be detected in a channel.

After the point 520 at which the EAP period 530 terminates is reached, the node A may determine whether to use a channel by using a backoff counter through contention, and may subsequently transmit information to the hub 1. In this example, node A senses that node B is transmitting during a first sensing operation. In a second sensing operation, node A determines that node B is no longer transmitting, and allows a an appropriate backoff time to elapse before beginning to transmit.

Figure 6:
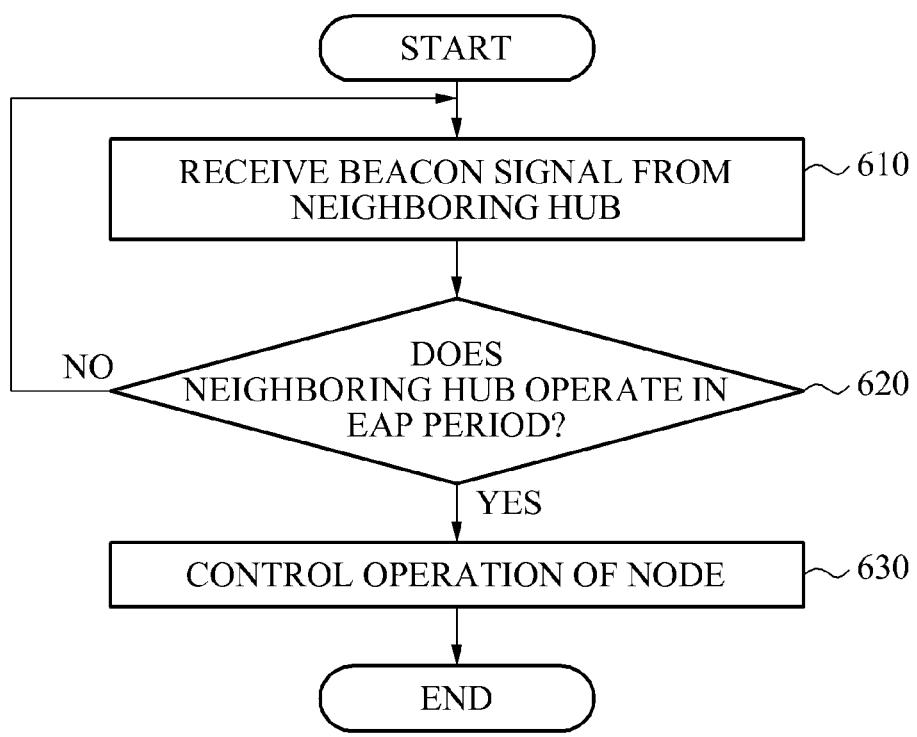
FIG. 6 is a flowchart illustrating an example of a method for low-power wireless communication.

FIG. 6 illustrates an example of a method for low-power wireless communication.

In 610, a hub receives a beacon signal from a neighboring hub. The hub may receive the beacon signal from the neighboring hub that is within a predetermined area.

In 620, the hub determines whether the neighboring hub operates in an EAP period based on the beacon signal. For example, the hub may determine whether the neighboring hub operates in the EAP period by decoding the beacon signal.

In 630, the hub controls an operation of a node based on information about a point at which the neighboring hub terminates the operation of the EAP period. For example, the hub may cause the node to operate in a sleep mode until a point at which the EAP period terminates.

Figure 7:
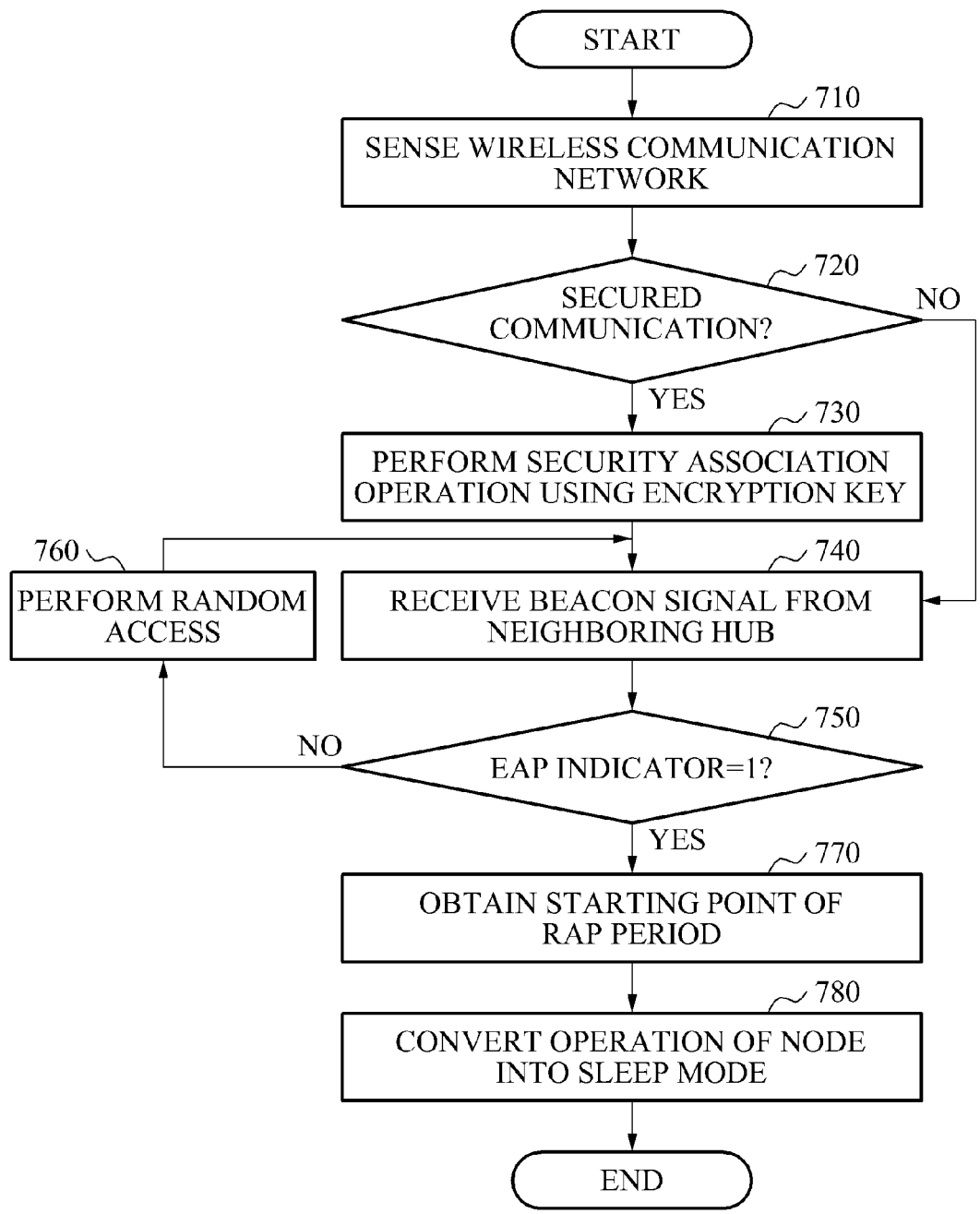
FIG. 7 is a flowchart illustrating another example of a method for low-power wireless communication.

FIG. 7 illustrates another example of a method for low-power wireless communication.

In 710, a hub senses a wireless communication network present within a predetermined area. For example, the hub may sense a wireless communication network that generates interference by being located in a static state in an area for a predetermined period of time. As another example, the hub may receive a beacon signal of a node in the wireless communication network being accessed, and may sense the wireless communication network by decoding the beacon signal.

In 720, the hub determines whether a communication scheme of the sensed wireless communication network corresponds to a secured communication scheme.

In 730, the hub performs a security association operation using an encryption key if the communication scheme of the sensed wireless communication network corresponds to a secured communication scheme. For example, the hub may prepare to start communication with the sensed wireless communication network by performing the security association operation. If the communication scheme of the sensed wireless communication network corresponds to a non-secured communication scheme, the hub may receive a beacon signal from a neighboring hub.

In 740, the hub receives a beacon signal from a neighboring hub included in the sensed wireless communication network after completing the security association operation. As an alternative example, the hub may receive a beacon signal from a neighboring hub without performing the security association operation.

In 750, the hub determines whether the neighboring hub operates in an EAP period. For example, the determination may be made based on a value of an EAP period indicator included in the beacon signal. The EAP period indicator may indicate whether the neighboring hub operates in the EAP period.

In 760, in response to a determination that the neighboring hub is to operate in a period other than the EAP period, the hub receives information from the node, for example, by performing a random access with the node.

In 770, in response to the neighboring hub being determined to operate in the EAP period, the hub obtains information about a starting point of an RAP period by decoding the beacon signal.

In 780, the hub transmits a sleep mode conversion instruction to a node having a lower priority. For example, the hub may cause the node to maintain the sleep mode until the starting point of the RAP period is reached by transmitting information about the starting to point of the RAP period.

Figure 8:
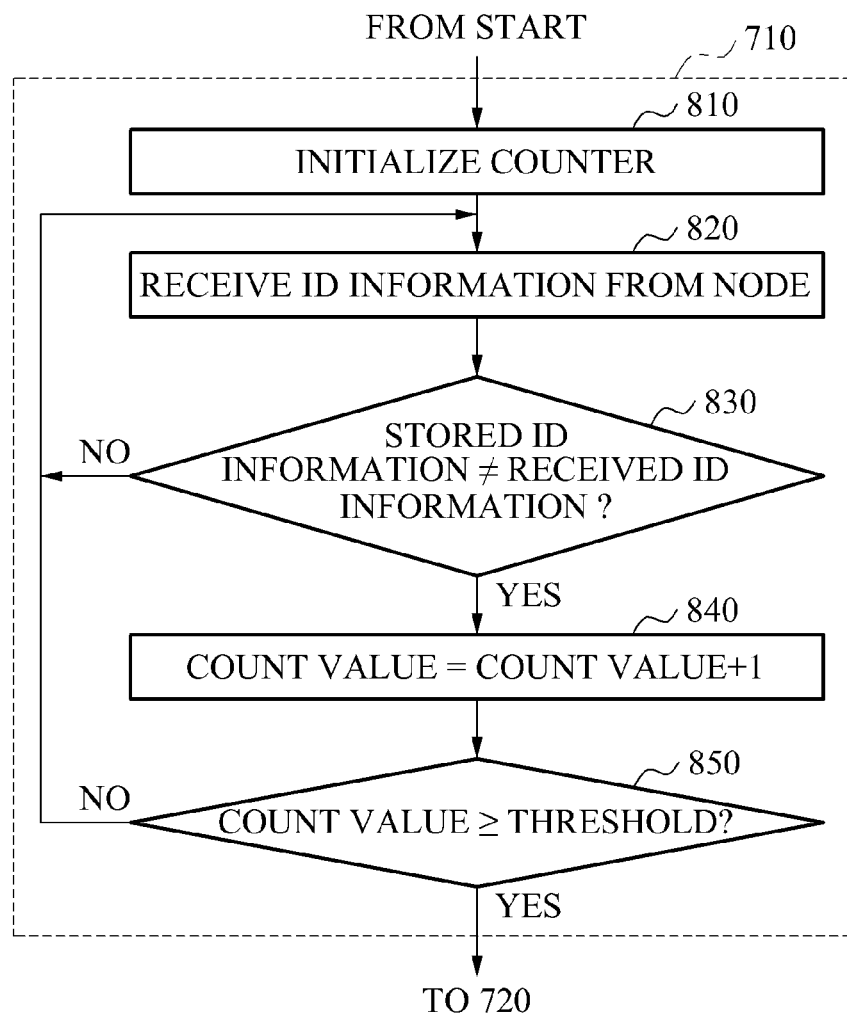
FIG. 8 is a flowchart illustrating an example of a sensing operation of a wireless communication network of FIG. 7.

FIG. 8 illustrates an example of a sensing operation of a wireless communication network. The sensing operation may correspond to operation 710 of FIG. 7.

In 810, a hub initializes a counter. For example, the hub may initialize a count value to "0" so as to sense a new wireless communication network.

In 820, the hub receives ID information from a node accessing a predetermined area. For example, the predetermined area may refer to an area in which the hub may perform communication. For example, the ID information may refer to an ID.

In 830, the hub determines whether the ID information received from the node being accessed matches ID information stored in a DB. In response to the matching ID information being included in DB, the hub may determine that the node being accessed is a node included in the same wireless communication network, and may terminate sensing of the new wireless communication network or wait until ID information is received from a new node.

In 840, in response to the ID information not matching information stored in the DB, the hub increases the count value by "1." The increased count value may be stored as an updated value in the counter.

In 850, in response to the count value of the counter being greater than or equal to a predetermined value, the hub determines that a new wireless communication network is accessed. In response to the count value being less than the predetermined value, the hub may determine that the node is visiting the predetermined area of the node.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A low-power wireless hub apparatus, comprising:
   a receiver configured to receive a beacon signal from a neighboring hub that is within a predetermined area; and
   a controller configured to
       determine whether the neighboring hub operates in an exclusive access phase (EAP) period in which a node served by the neighboring hub has exclusive access to a wireless channel, based on the beacon signal, and
       control an operation of a node served by the low-power hub apparatus to wake up when the EAP period of the neighboring hub terminates or when a random access phase (RAP) period of the neighboring hub begins.

2. The low-power wireless hub apparatus of claim 1, wherein the controller is further configured to maintain an operation of the node served by the low-power hub apparatus in a sleep mode until the EAP period of the neighboring hub terminates or the RAP period of the neighboring hub begins.

3. The low-power wireless hub apparatus of claim 1, further comprising:
   a transmitter configured to transmit an instruction that controls an operation of the node served by the low-power hub apparatus.

4. The low-power wireless hub apparatus of claim 1, further comprising:
   a sensing unit configured to sense an access of a wireless communication network by the neighboring hub;
   a security determining unit configured to determine whether a communication scheme of the sensed access of the wireless communication network is protected by security; and
   a security association unit configured to perform a security association operation with the sensed neighboring hub using an encryption key, in response to the communication scheme of the sensed access of the wireless communication network being protected by security.

5. The low-power wireless hub apparatus of claim 4, wherein the sensing unit comprises:
   an identification (ID) information receiver configured to receive ID information from a node of the wireless communication network being accessed;
   an ID information determining unit configured to determine whether the received ID information matches ID information stored in a database (DB) of the low-power wireless hub apparatus;
   a counter configured to increase a count value, in response to the received ID information not matching the ID information stored in the DB; and
   a neighbor determining unit configured to determine whether the sensed wireless communication network is within a predetermined distance, in response to the count value of the counter being greater than or equal to a predetermined threshold.

6. The low-power wireless hub apparatus of claim 1, wherein the controller is configured to
   obtain information about a starting point of the RAP period of the neighboring hub by decoding the beacon signal, and
   maintain an operation of the node served by the low-power hub apparatus in a sleep mode until the starting point of the RAP begins.

7. The low-power wireless hub apparatus of claim 3, wherein the transmitter is configured to transmit a beacon signal including an indicator indicating that the node served by the low-power hub apparatus operates in an EAP period of the low-power wireless hub apparatus.

8. The low-power wireless hub apparatus of claim 1, wherein
   the low-power hub apparatus is a hub in a wireless body area network (WBAN),
   the neighboring hub is in a neighboring WBAN, and
   the node served by the neighboring hub has a higher priority than the node served by the low-power wireless hub apparatus.

9. The low-power wireless hub apparatus of claim 1, wherein the controller is configured to determine whether the neighboring hub operates in the EAP period of the neighboring hub in which the node served by the neighboring hub has exclusive access to the wireless channel, based on a value of an EAP period indicator included in the beacon signal.

10. The low-power wireless hub apparatus of claim 1, wherein the receiver is configured to receive data from the node served by the low-power communication apparatus during a superframe of the neighboring hub.

11. A low-power wireless node apparatus, comprising:
a receiver configured to receive an instruction, from a hub that serves the low-power wireless node apparatus; and
a controller configured to control, based on the instruction, an operation of the low-power wireless node apparatus to wake up when an exclusive access phase (EAP) period of a neighboring hub terminates or when a random access phase (RAP) period of the neighboring hub begins, the EAP period being a period in which a node served by the neighboring hub has exclusive access to a wireless channel.

12. The low-power wireless node apparatus of claim 11, wherein the receiver is configured to receive, from the hub, an instruction to maintain an operation of the low-power wireless node apparatus in a sleep mode until the the EAP period of the neighboring hub terminates or the RAP period of the neighboring hub begins.

13. The low-power wireless node apparatus of claim 12, further comprising:
a transmitter configured to transmit sensed biometric information to the hub that serves the low-power wireless node apparatus after the EAP period of the neighboring hub terminates.

14. The low-power wireless node apparatus of claim 11, wherein:
the receiver is configured to receive information about a starting point of the RAP period of the neighboring hub, and
the controller is configured to maintain an operation of the low-power wireless node apparatus in a sleep mode until the starting point of the RAP period of the neighboring hub begins.

15. The low-power wireless node apparatus of claim 12, wherein
the low-power node apparatus is a in a wireless body area network (WBAN),
the neighboring hub is in a neighboring WBAN, and
the node served by the neighboring hub has a higher priority that is higher than the low-power wireless node apparatus.

16. A method of a low-power wireless hub, the method comprising:
receiving, by the low-power wireless hub, a beacon signal from a neighboring hub within a predetermined area;
obtaining, based on the beacon signal, at least one of a first information about a termination point of an exclusive access phase (EAP) period of the neighboring hub and a second information about a starting point of a random access phase (RAP) period of the neighboring hub; and
controlling an operation of a node served by the low-power wireless hub to wake up during a superframe of the neighboring hub, based on at least one of the first information and the second information.

17. The method of claim 16, wherein the controlling comprises maintaining an operation of the node served by the low-power wireless hub in a sleep mode until the EAP period of the neighboring hub terminates.

18. The method of claim 16, further comprising:
transmitting, to the node served by the low-power wireless hub, an instruction that controls an operation of the node served by the low-power wireless hub.

19. The method of claim 16, further comprising:
sensing an access of a wireless communication network by the neighboring hub;
determining whether a communication scheme of the sensed access of the wireless communication network is protected by security; and
performing a security association operation with the neighboring hub using an encryption key, in response to the communication scheme of the sensed wireless communication network being protected by security.

20. The method of claim 19, wherein the sensing comprises:
receiving identification (ID) information from a node of the wireless communication network being accessed;
determining whether the received ID information matches ID information stored in a database (DB) of the low-power wireless hub;
increasing a count value, in response to the ID information not matching ID information stored in the DB; and
determining whether the sensed wireless communication network is within a predetermined distance, in response to the count value of the counter being greater than or equal to a predetermined threshold.

21. The method of claim 16, wherein
the low-powered wireless hub is in a wireless body area network (WBAN),
the neighboring hub is in a neighboring WBAN, and
the node served by neighboring hub has a priority than the node served by the low-power wireless hub.

22. The method of claim 16, wherein the obtaining of the at least one of the first information about the termination point of the EAP period of the neighboring hub and the second information about the starting point of the RAP period of the neighboring hub is based on a value of an EAP period indicator included in the beacon signal.

* * * * *